United States Patent [19]

Tsuchiya et al.

[11] Patent Number: 5,115,495

[45] Date of Patent: May 19, 1992

[54] COMMUNICATIONS NETWORK SYSTEM USING FULL-JUNCTURE AND PARTIAL-JUNCTURE STATION STATUS INFORMATION FOR ALTERNATE-PATH DISTANCE-VECTOR ROUTING

[75] Inventors: Paul F. Tsuchiya, Washington, D.C.; W. Worth Kirkman, Fairfax; John F. Weidner, Springfield, both of Va.

[73] Assignee: The Mitre Corporation, Bedford, Mass.

[21] Appl. No.: 259,329

[22] Filed: Oct. 18, 1988

[51] Int. Cl.⁵ .......................................... G06F 15/16
[52] U.S. Cl. ........................... 395/200; 364/242.94; 364/242.5; 364/230; 364/284.3; 364/DIG. 1; 370/94.1
[58] Field of Search ............. 379/221; 370/94.1, 94.3, 370/85.13, 60, 60.1, 94.2, 95.1, 85.7; 364/200 MS File, 900 MS File; 340/825.02, 825.03

[56] References Cited

U.S. PATENT DOCUMENTS

| | | | |
|---|---|---|---|
| 4,347,498 | 8/1982 | Lee | 340/825.02 |
| 4,466,060 | 8/1984 | Riddle | 364/200 |
| 4,479,196 | 10/1984 | Ferrer | 364/900 |
| 4,556,972 | 12/1985 | Chan | 370/95.1 |
| 4,644,532 | 2/1987 | George | 370/94.3 |
| 4,656,658 | 4/1987 | King | 379/221 |
| 4,679,189 | 7/1987 | Olson | 370/60 |
| 4,701,756 | 10/1987 | Burr | 340/825.02 |
| 4,706,080 | 11/1987 | Sincoskie | 370/87.13 |
| 4,736,363 | 4/1988 | Aubin | 370/94.1 |
| 4,742,511 | 5/1988 | Johnson | 370/94.1 |
| 4,748,660 | 5/1988 | Deveze | 364/514 |
| 4,754,479 | 6/1988 | Bicknell | 379/221 |
| 4,771,424 | 9/1988 | Suzuki | 370/85.7 |
| 4,796,023 | 1/1989 | King | 340/825.02 |
| 4,823,111 | 4/1989 | Tsuchiya | 340/825.05 |
| 4,845,744 | 7/1989 | DeBendictis | 379/221 |
| 4,872,197 | 10/1989 | Pemmaraju | 340/825.02 |
| 4,905,233 | 2/1990 | Cain | 370/94.1 |
| 4,952,930 | 8/1990 | Franaszek | 340/825.02 |
| 4,987,536 | 1/1991 | Humblet | 364/200 |

OTHER PUBLICATIONS

Garcia-Luna-Aceves (1987), A New Minimum-Hop Routing Algorith, Proceedings IEEE Infocom '87, pp. 170-180.
Jaffee et al. (Jul., 1982), A Responsive Distributed Routing Algorithm for Computer Networks, IEEE Trans. on Communications, vol. COM-30, No. 7, pp. 1758-1762.
McQuillan et al. (May, 1980), The New Routing Algorithm for the Arpanet, IEEE Trans. on Communications, vol. COM-28, No. 5, pp. 711-719.
Schwartz et al. (Apr., 1980), Routing Techniques Used in Computer Communication Networks, IEEE Trans. on Communications, vol. COM-28, No. 4, pp. 539-552.
McQuillan et al. (Apr., 1978), Arpanet Routing Algorithm Improvements First Semiannual Technical Report, Bolt Beranek and Newman Inc., Report No. 3803.
T. Cegrell (Jun., 1975), A Routing Procedure for the Tidas Message-Switching Network, IEEE Trans. on Communications, vol. COM-23, No. 6, pp. 575-585.

Primary Examiner—Thomas C. Lee
Assistant Examiner—Eric Coleman
Attorney, Agent, or Firm—Choate, Hall & Stewart

[57] ABSTRACT

Apparatus and method for routing messages in a communications network having a plurality of communications stations interconnected by a plurality of communication links, and having at least one destination station. Each communications station informs each neighboring communications station of the distance between itself and the destination station. Each communications station stores information identifying a first neighboring station through which it has a primary path to the destination station. The primary path is the shortest of all possible paths to the destination station. Each communications station that is connected to the destination station by at least one alternate path stores information identifying a second neighboring station through which it has an alternate path to the destination station.

19 Claims, 2 Drawing Sheets

COMMUNICATIONS NETWORK SYSTEM USING FULL-JUNCTURE AND PARTIAL-JUNCTURE STATION STATUS INFORMATION FOR ALTERNATE-PATH DISTANCE-VECTOR ROUTING

BACKGROUND OF THE INVENTION

This invention relates to routing techniques in communications networks, and, more particularly, to distributive adaptive routing techniques.

Overview of Routing Techniques.

At a fundamental level, all routing in communications networks involves one problem: A switch must decide on which outbound queue to place a message, or which circuit to establish, based on the destination address of the message or call setup, or some other information such as quality-of-service or logical channel number. This decision is made by querying a routing table. Routing techniques do not relate to the act of querying the routing table and queueing a message; rather, routing techniques relate to how the routing table becomes established.

Routing techniques can be partitioned into two broad classes, static and adaptive. A good overview of routing techniques may be found in Schwartz, M., and Stern, T. (April, 1980) "Routing Techniques Used in Computer Communication Networks," IEEE Transactions on Communications, Vol. COM-28, No.4. In static routing, routing tables are established at some point in time, conceptually before any data is being transmitted, and the routing table is not changed afterwards. Within this class, there are two sub-classes, alternate and non-alternate. In alternate static routing, more than one choice of route is available. All routes may be used simultaneously, or secondary routes may go unused until primary routes are full or down. Alternate static routing can be very robust in environments in which links stay up for long periods of time, and in which traffic patterns are known in advance. Public circuit-switched telephone networks use alternate static routing.

In adaptive routing, the network environment (status of links, traffic levels, etc.) is monitored, and routing tables are dynamically adjusted to adapt to changing network conditions. Adaptive routing techniques can be partitioned into two major sub-classes, centralized and distributed. In centralized adaptive routing, switches monitor network changes and send them to a central machine, which calculates new routes and distributes the new routes back to the switches. The central machine and the switches must utilize old routes to each other in order for the new routes to be distributed. Synchronization of the updates among all switches can be a complex task.

In distributed adaptive routing, switches monitor network status, inform each other of changes, and calculate routes themselves. There are two classes of distributed adaptive routing, distance-vector and link-state. These two descriptive terms were coined by Radia Perlman, and are not yet in wide use in literature. These are the terms which have been adopted in the recent American National Standards Institute (ANSI) work on routing, and will be used here. In distance-vector routing, neighbor switches trade lists of their distances to every destination with each other, keeping the shortest distance for routing. Eventually, all routing tables will converge to shortest path. In link-state routing, switches distribute lists of the state of each of their links to all other switches in the network. Upon receiving these lists, each switch is able to build a consistent topology map of the network, and then calculate routes based on the topology. Link-state routing is currently in use in the ARPANET, and is often called "shortest path first" ("SFP"), "new routing ARPANET", or "Dijkstra's algorithm."

Both link-state routing and distance vector routing have advantages and disadvantages relative to each other. One advantage of distance vector routing, however, is that it makes routing table reduction easier, especially in the context of routing hierarchies. This advantage is due to the fact that distance-vector routing requires less information than link-state routing. Therefore, there are certain environments in which distance-vector routing is the most appropriate choice.

Evolution of Distance-Vector Routing

This subsection presents an evolution of distance-vector routing. For a thorough exposition of all relevant work in this field up to 1983, see J. Hagouel (1983), "Issues in Routing for Large and Dynamic Networks," PhD. Thesis, Columbia University. Various distance-vector routing schemes are variously referred to in the literature as "ARPANET," "old ARPANET," "Bellman-Ford," "Ford," and "Tajibnapis."

One of the earliest versions of the distance-vector routing algorithm was implemented in the ARPANET in the early 1970s. In this version, every node maintains a distance table and a routing table. The distance table contains the distance to every destination for every link the node has. The routing table contains the shortest distance to every destination, and the link over which that distance is found. Every node in the network periodically broadcasts its routing table to its neighbors. Upon receiving a broadcast, a node stores in its distance table the distance advertised by the neighbor plus the distance from it to the neighbor. For routing purposes, a node puts in its routing table the smallest distance seen in the distance table. Then, when a node has a packet to route, it looks in the routing table to find the link over which the shortest path to the destination can be found.

Referring to FIG. 1, a communications network 10 contains nodes or stations 12 connected by communications links 14. Routing entries to Node A are established according to the ARPANET scheme as follows: Assume that initially no nodes except Node A have routing entries for Node A. Assume also for the moment that all link costs are 1. Node A informs Node B of its identity (essentially, a routing entry for Node A with a distance of 0). Node B takes this information and fills in its routing entry for Node A via Link B-A as distance 1. Node B subsequently sends its routing table to nodes C,D, and A. Nodes C and D then enter a distance of 2 in their routing tables for Node A via Links C-B and D-B respectively. Now consider what happens when Node C broadcasts its routing tables to Nodes B and E. Node E will create an entry of distance 3 to Node A via Link E-C. Node B, however, will create an entry of distance 3 to Node A via Link B-C. After all of the routing tables have been exchanged several times and the algorithm converges, Node B will have routing entries for Node over all its links. Those entries will indicate that Node A is reachable at distance 1 over Link B-A, at distance 3 over link B-C, and at distance 3 over link B-D. Since distance 1 is Node B's shortest distance to Node A, Node B will use Link B-A to route messages to Node A.

The Count to Infinity Problem

The obvious problem is created when Node B finds that the value of Link B-A is increased, say to 20. Now Node B sees that it is distance 20 to Node A via Link B-A, but only distance 3 via Links B-C and B-D. Node B will therefore route messages to Node A via Node C or D. Of course, Nodes C and D see Node B as the best path to Node A, and so will send the message right back to Node B, thereby creating a loop.

It will take some time for the exchange of routing tables to eliminate this loop. Notice that, during the next exchange of routing tables, Node B will inform Node C that its new shortest distance to Node A is 4. Node C will take this distance plus 1 as its new shortest distance, and subsequently inform Node B of the new distance. Node B will now have a distance of 6 to Node A via Node C. This counting up will continue until Node A sees a distance of 21 to Node A via Node C and finally correctly chooses Link B-A as its link to Node A. This counting up has been called the counting-to-infinity problem.

A solution to this simple form of counting-to-infinity, called the ping-pong loop or predecessor loop, because a message immediately loops back over the same link, was proposed as early as 1975. T. Cegrell (June, 1975), "A Routing Procedure for the Tidas Message-Switching Network," *IEEE Trans. on Communications*, Vol. COM-23, No. 6, pp. 575-585. (split-horizon technique). Several more solutions have been proposed since then. In the example of FIG. 1, these solutions would either have Node C tell Node B that it is using Node B to get to Node A, or simply have Node C never repeat to Node B anything it heard from Node B.

The counting-to-infinity problem still exists, however. If Link B-A increases to 20, Node B will tell Nodes C and D that it is distance 20 from Node A. Nodes C and D will tell Node A that they are distance 4 from Node A (remembering the updates they got from Node E). Node B will then use either C or D for its path to Node A, and a loop will be created around Nodes B, C, E, and D. Node B will tell Nodes C and D that it is distance 5 from Node A, and a count to infinity would ensue around Nodes B, C, E, and D.

Solutions proposed by J. M. Jaffe, F. H. Moss (July, 1982), "A Responsive Distributed Routing Algorithm for Computer Networks," IEEE Trans. on Communications, COM-30, No. 7, pp. 1758-1762, and by J. Hagouel (1983), "Issues in Routing for Large and Dynamic Networks," PhD. Thesis, Columbia University, further attack the counting-to-infinity problem by not allowing Node C to tell Node B anything it hears about Node A as long as Node B is on Node C's path to Node A. In other words, the distance table is removed, and each node only knows of one possible path to the destination. Therefore, if the distance to a destination increases, a node will temporarily have no path to a destination, and must actively search out a (possibly) better path. These schemes trade off not being able to use a second path when it exists for avoiding counting to infinity when a second path doesn't exist. The two schemes differ in how they go about searching for a better path. However, both schemes base their searches on a fundamental characteristic of the counting-to-infinity problem noted in J. M. McQuillan, I. Richer, E. C. Rosen, (April, 1978) "ARPANET Routing Algorithm Improvements First Semiannual Technical Report," Bolt Beranek and Newman Inc., Report No. 3803. This fundamental characteristic is paraphrased as follows: A count to infinity may occur only if a routing update received by a node is based on an update which was previously sent by that node. In other words, a count to infinity will occur if a node is uptree from itself on the spanning tree defined by the routing table entries for a given destination. (Uptree is further from the destination node, where the spanning tree is rooted. Downtree is closer to the destination node.) This condition will only occur if the node experiences an increase in its distance to a destination (bad news), but afterwards receives good news (any distance that is shorter than that of the bad news) that it had previously sent about that destination. This condition is possible because good news is retained in nodes whereas bad news is forgotten. Good news, then, has a tendency to overtake bad news, even if the good news is out of date.

The Jaffe-Moss Solution

The Jaffe-Moss scheme is to prohibit each node from indirectly receiving old good news from itself, by prohibiting each node from accepting any good news about a destination until every node uptree from it has received the bad news. When a node receives bad news, or discovers bad news by a local link measurement, it passes the bad news to all other neighbors. If a node receives bad news from a non-uptree node, it acknowledges the node or nodes from which it heard the bad news. When a node gets acknowledgements from every node to which it sent bad news, it acknowledges its downtree nodes, and afterwards accepts any good news it hears.

Referring to FIG. 2, nodes or stations 12 in communications network 10 are connected by communication links 14. The arrows on the links point to the next hop from each node towards the destination DES. Assume that N1 determines that its distance to DES has increased. N1 sends this bad news to N2, and enters the freeze state. N2 sends the bad news to N3 and N5, and enters the freeze state. Similarly, N3 and N5 send the bad news to N4 and N6 respectively, and likewise enter the freeze state. When N4 sends the bad news to N7 and N6, both N6 and N7 acknowledge to N4 that they are not uptree from N4, thus allowing N4 to unfreeze. Likewise, N6 will receive an acknowledgement from N4. The wave of acknowledgements travel back uptree to N1, at which time all nodes are unfrozen and may accept good news.

Since in the Jaffe-Moss scheme, good news is only sent when it is received (i.e., the scheme is event driven), a node may receive bad news but not receive valid good news for a long time thereafter. For instance, after all of the nodes in FIG. 2 are unfrozen, N7 may offer N4 a better path to DES than does N3. However, until N7 receives new news itself, it does not inform N4 of its distance to DES for an indeterminate period of time.

The obvious solution might appear to be to allow a node acknowledging bad news to include its current distance. This solution will lead to counting to infinity, however. For example, return to the situation in which N1's distance to DES has increased and a wave of bad news is being sent uptree. Assume that the bad news reaches N6, and N6 forwards it to N4, before the bad news reaches N4 via N3. N4 will acknowledge N6 with its distance to DES via N3. N6 will spread the good news to N5, which will in turn spread it to N2, causing N2 to believe that N5 is its next hop to DES. At this point, a count to infinity has occurred from N2 to N5 to N6 to N4 to N3 and back to N2.

Even if distances are not allowed to be reported with acknowledgements, as Jaffe-Moss specifies, counting to infinity can still occur. Consider the case in which N1's distance to DES decreases. N1 spreads this good news uptree to N2, and N2 passes it on to N3 and N5. Now assume that immediately after this, the link from N2 to N1 experiences an increase in distance. N2 sends bad news to N3 and N5. Assume that the good news and the bad news travels to N4 via N6 before even the good news can travel to N4 via N3. Assume also that the good news that N4 heard doesn't affect its next hop to DES. When N4 receives the bad news from N6, it will acknowledge N6. Assume that shortly thereafter N4 receives the good news from N3. Now N4 tells N6 of this good news, N6, tells N5, N5 tells N2, and again a count to infinity has occurred.

Jaffe-Moss present a variation of their algorithm as a worst-case performance optimization that appears to always prevent counting to infinity. This variation requires that all nodes remain frozen until the initiator of bad news receives all of its acknowledgements. The initiator unfreezes its uptree nodes with a special unfreeze message. This variation improves worst-case performance at the expense of average performance, due to the extra unfreeze message required.

The Hagouel Solution

The Hagouel scheme does not prevent counting-to-infinity, although it does decrease the probability of such an event. In the Hagouel scheme, a node queries all of its neighbors except its downtree neighbor for a better route when its own path to a destination increases. If a node receiving such a query is uptree from the sender, it doesn't reply, thus avoiding a potential count to infinity. If a node receiving such a query is not uptree from the sender, and is closer to the destination node than the sender, then the node receiving the query responds. Unfortunately, the responding node has no way of knowing whether it (1) is not uptree on the tree from the node that originally started the wave of queries, or whether it (2) is uptree on the tree from the node that originally started the wave of queries, but has simply not yet received the bad news. In case 1 no count to infinity will occur. In case 2, old good news is usurping the bad news and a count to infinity may form. This result is similar to the example set forth in our discussion of the Jaffe-Moss scheme in which a non-uptree node could acknowledge with its distance to the destination.

The Hold-down Solution

A third method of dealing with the counting-to-infinity problem is for a node simply to wait a certain amount of time after hearing bad news about a destination before accepting any new news. This method is similar to the Jaffe-Moss and Hagouel schemes in that there is a time delay before new news may be accepted. It is different from those two schemes, however, in that there is no mechanism to actively flush out old news or search for new news. Instead, the node simply waits for a period of time, called the hold-down time, during which it can be sure that the old news has been completely flushed through the normal update process.

In routing schemes in which the routing metric is hop count, the hold-down time is the diameter of the network multiplied by maximum time that it takes for routing news to propogate from one node to the next. In routing schemes in which the link routing metric is some variable quantity, the hold-down time is the maximum value of the routing metric multiplied by the routing news propagation time. Thus, the hold-down time has a much larger value. Therefore, hold-down is only practical in schemes that use hop-count as the routing metric, or as an ancillary metric for the purpose of reducing the hold-down time.

The Garcia-Luna Solution

More recently, Garcia-Luna put forth yet another solution to the counting-to-infinity problem Garcia-Luna-Aceves J.J. (1987), "A New Minimum-Hop Routing Algorithm," Proceedings IEEE Infocom '87, pp. 170–180. His approach is similar to Hagouel's in that a search uptree for a non-uptree node takes place in the event of bad news. No routing over the increased links takes place until new news is found. Garcia-Luna improves on Hagouel in that he provides a method for forcing bad news sent uptree to stay in the system until new news is found. A node must prove, by means of a complex scheme, that it is a feasible next hop to a destination before the node will be believed.

There can be substantial thrashing before convergence occurs. For example, consider the network of FIG. 3, in which communications network 10 consists of stations or nodes 12, links 14, and destination 16. If the link between Node a1 and DEST crashes, bad news will travel up the two branches from a1. One of the bad news signals, say the one from a3, will arrive at PJ1 before the other and PJ1 will believe it has found better news on the other (b3) downtree branch of PJ1. False good news will travel back downtree towards a1 via a3. Shortly afterwards, the bad news coming up from b3 will reach PJ1. In this case, however, PJ1 will not think that a3 offers a better path. The bad news from PJ1 will then chase the incorrect good news down towards a1 via a3, and will wipe out the good news when it reaches a1. Meanwhile, the original bad news will have gone up to J2 via c5, and will have found new news there. This new news will travel back down to a1 via c6, and only then will a1 be able to route to DEST.

SUMMARY

Except for the simple hold-down, all of the solutions set forth above trade off both (1) delay in finding better paths and (2) traffic generated while searching for the better path, for avoiding the count-to-infinity problem. The hold-down solution trades off delay in finding better paths for avoiding counting to infinity.

SUMMARY OF THE INVENTION

In order to summarize the invention, it will first be necessary to define some terms. The terms "downtree," "uptree," and "horizontal," as used herein and in the appended claims, are defined as follows: Node b is considered downtree from Node a if Node b is on Node a's best path to a destination. If Node b is downtree from Node a, then Node a must be uptree from Node b. Otherwise, Node a and Node b are said to be horizontal from each other even if Node a is closer to the destination, by some metric, than Node b. As used herein and in the appended claims, the term "neighboring station" or "neighboring node" is defined as follows: Node b is a neighboring node of Node a if Node a is connected directly to Node b by a communications link, with no intervening nodes.

Consider two routing trees A and B emanating from some node DEST. Assume that these two trees join at some node J such that Node J could as easily route a packet to DEST via tree A or via tree B. For example, Node J might be exactly x hops from DEST via either tree. Node J is called a juncture node. Note that a juncture can occur between two nodes, for example $J_A$ and $J_B$, if both $J_A$ and $J_B$ share a link, but route to DEST only via their respective trees. In this case, both $J_A$ and $J_B$ are called juncture nodes. As used herein and in the appended claims, the term "full-juncture" refers to a node or station having at least two downtree paths to a destination node or station which paths do not share any communications links. The term "partial-juncture" refers to a node or station having at least two downtree paths, via distinct downtree neighbor stations, to a destination node or station, which paths share at least one downtree communications link. A "branching node" or "branching station" is a node or station that has more than one neighboring node or station that is uptree from a destination.

The invention is a technique for dealing with the counting-to-infinity problem, and is called Alternate-path Distance-vector Routing (ADR). ADR requires roughly the same memory and link bandwidth as Garcia-Luna's algorithm, when one takes into consideration the thrashing that can occur in Garcia-Luna's scheme. However, it provides instant rerouting in response to a metric change. There is no "hold-down" or "freeze" time while a new path is being found, because alternate paths are prediscovered before bad news occurs.

In one aspect the invention features a communications network consisting of a plurality of communications stations interconnected by a plurality of communications links, and at least one destination station. Each communications station informs each neighboring communications station of the distance between itself and the destination station. Each communications station stores an indication of the distance to the destination station through each downtree neighboring communications station. Each communications station that is not a full-juncture station stores an indication of the distance to the destination station through all uptree neighboring communications stations that lead to a full-juncture station. Each communications station that is not a full-juncture station stores an indication of the distance to the destination station through all uptree neighboring communications station that lead to a partial-juncture station that acts as a juncture station for the communications station that is not a full-juncture station.

In preferred embodiments, each communications station stores an indication of the metric value associated with each communication link to each neighboring communications station. The communications stations respond to metric changes along communication links, including those brought about by failures, by updating the information stored in each communications station to reflect changes in the communications network brought about by the metric changes.

In another aspect, the invention features a communications network in which each communications station stores information identifying a first neighboring station through which it has a primary path to the destination station. The primary path is the shortest of all possible paths to the destination station. Each communications station that is connected to the destination station by at least one alternate path stores information identifying a second neighboring station sthrough which it has an alternate path to the destination station. In preferred emobdiments, whenever a metric change occurs along the primary path of a communications station, the change causing the distance from the communications station to the destination station to be longer along the primary path than along the alternate path, the alternate path becomes a new primary path.

In another aspect, the invention features a communications network in which each communications station stores information identifying each uptree neighboring communications station as uptree, each downtree neighboring communications station as downtree, and each horizontal neighboring communications station as horizontal.

In another aspect, the invention features a communications network in which each full-juncture station stores information identifying itself as a full-juncture station, each partial-juncture station stores information identifying itself as a partial-juncture station, and each communications station that is not a full-juncture station and that is not a partial-juncture station stores information identifying itself as a non-juncture station.

In another aspect, the invention features a communications network in which each station determines that it is a juncture station from the fact that it has more than one neighboring station that is not uptree from it.

In another aspect, the invention features a communications network in which each juncture station determines whether it is a full-juncutre station or a partial juncture station based on information contained in a juncture configuration message that the juncture station receives from its non-uptree neighboring stations, and which the juncture station passes on, in modified form, to its non-downtree neighboring stations.

In another aspect, the invention features a communications network in which each full-juncture station transmits an alternate path priming message to each downtree communications station until the alternate path priming message reaches another full-juncture station. The alternate path priming message informs the downtree communications station that they have a path to the destination station through the full-juncture station. In preferred embodiments, each partial-juncture station transmits an alternate path priming message to each downtree communications station until the alternate path priming message reaches a branching station having at least two uptree paths to the partial-juncture station. The alternate path priming message informs the downtree communications station that they have a path to the destination station through the partial-juncture station.

In another aspect, the invention features a communications network in which each message that travels downtree from one communications station to a second communications station travels to a third communications station that is not uptree from the second communications station, absent a concurrent change in the configuration of the communications network. Each message that travels horizontally from one communications station to a second communications station travels to a third communications station that is downtree from the second communications station, absent a concurrent change in the configuration of the communications network.

In other aspects, the invention features methods of routing messages in the above-mentioned communications networks.

DESCRIPTION OF THE PREFERRED EMBODIMENTS

Structure and Operation

The Jaffe-Moss, Hagouel, and Garcia-Luna approaches to the counting-to-infinity problem attempt to guarantee that no old news uptree from a node that has experienced a distance increase will be misconstrued as new good news. These approaches do so by attempting to accept only news from nodes not uptree from the distance increase. The trick, then, is in recognizing which nodes are uptree from a given node, and which are not.

If there is a metric increase somewhere downtree from a juncture node that is the first juncture node from a destination DEST, then any new routing news will come from or through the juncture node because the juncture node is the first node that has access to another tree. Therefore, when a metric increase occurs, it is necessary only to find the nearest uptree juncture node in order to get new routing information. Note that this search need not extend beyond the nearest uptree juncture node because a juncture node further up the tree will only produce a higher routing metric than the closer juncture node, and would therefore be ignored anyway. This fact is important not only because it means that searches can be limited in scope, thus saving both time and communications resources, but more importantly, because it means that any juncture node higher up the tree than a lower juncture node does not need to concern itself with any metric increases that occur below the lower juncture node (at least, not with respect to its role as a juncture node).

Figure 4:
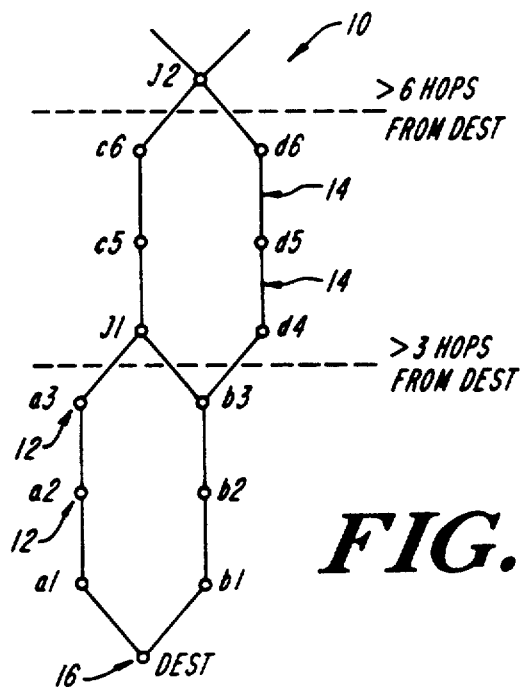
FIG. 4 is a drawing of a communications network having two full-junction stations.

For example, consider FIG. 4. Node J1 is a juncture node having two paths of equal distance to DEST. Node J2 is a juncture node above J1 having paths of equal distance to DEST. If there is a link failure, or any metric increase, on a link between two nodes labeled aX, the search for another path need go only as high as Node J1. If there is a failure on a link or node uptree from J1 or b3, the search for another path will go to J2. Note that J2 need not concern itself with the fact that one of its paths joins one of J1's paths downtree from J1. A link or node failure at or downtree from Node b3 will result in a search to J1 for routing news, a search that does not involve J2 at all. In other words, J2 acts as a juncture node for only a subset of nodes downtree from it—namely, those nodes that do not have a closer uptree juncture node. (After the link failure, J2 will no longer be a juncture node, but this problem is separate from the problem of nodes below b3 finding an alternate route.)

Figure 1:
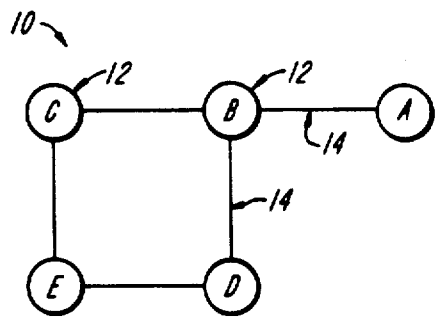
FIG. 1 is drawing of a communications network.
Figure 2:
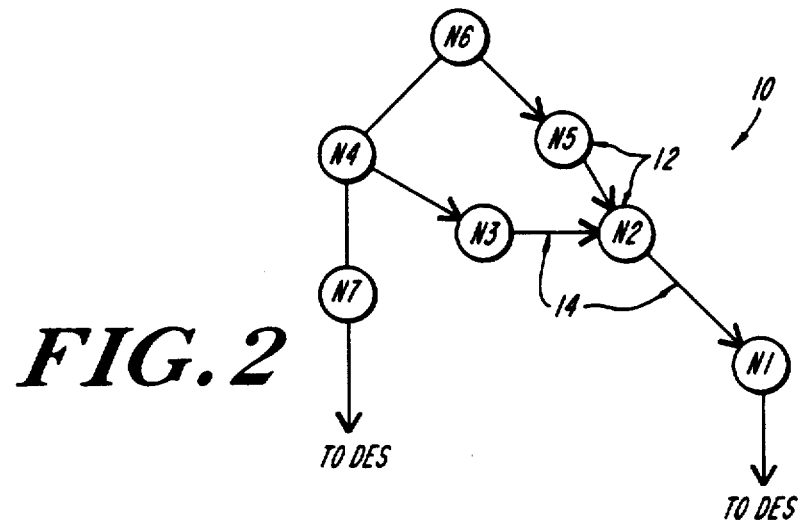
FIG. 2 is another drawing of a communications network.
Figure 3:
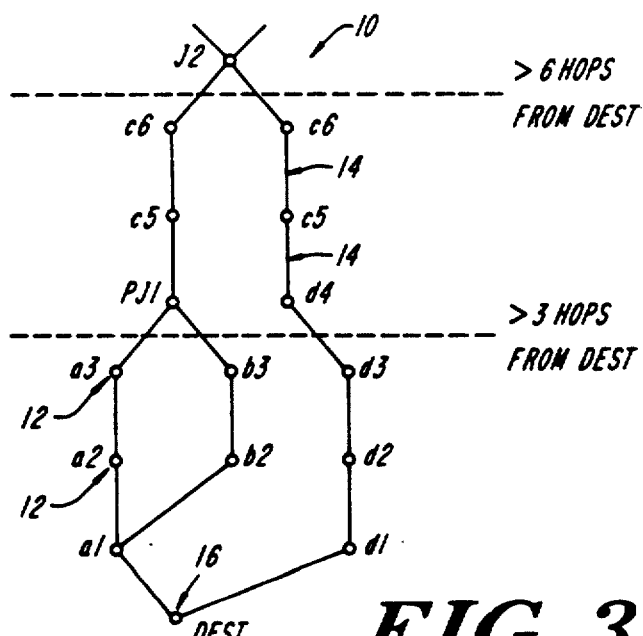
FIG. 3 is a drawing of a communications network having a full-junction station and a partial-junction station.

Consider Node PJ1 in FIG. 3. It is not a full-juncture node, because it does not attach to a separate tree emanating from DEST. In other words, it does not have two different paths back to DEST. It can, none-the-less, act as a juncture node for those nodes uptree from a1 and downtree from itself. PJ1 is therefore a partial-juncture node.

Each juncture node determines that it is a juncture node from the fact that it has more than one neighboring station that is not uptree from it. Juncture nodes determine whether they are full-juncture nodes or partial-juncture nodes as follows: Every routing update is accompanied by two fields. The packet with these fields is not itself a routing update, but is rather a Juncture Configuration (JC) message, which comes after or is tacked onto the same packet as the normal routing update. The first field, whose purpose is to configure full-junctures, and which is called the FJ Tree Label, contains a node identification. The second field, which is of variable length, and whose purpose is to configure partial-junctures, and which is called the PJ Tree List, contains a list of tuples each of which contain a node identification and the number of hops from that node to the destination. These two fields are filled in as follows:

1. Each neighbor of the destination puts its identification in the FJ Tree Label field and transmits the FJ Tree Label field uptree.

2. Each node, including each node that modifies the FJ Tree Label field, that has more than one uptree link adds to the PJ Tree List a tuple with its identification and the number of hops from the destination, and transmits the PJ Tree List field uptree.

3. A node knows that it is a full-juncture node because, of the different JC messages it has received on its downtree links, at least one of them has a FJ Tree Label entry that differs from the others. Each full-juncture node removes all entries in the PJ Tree List, and writes its own identification into the FJ Tree Label field.

4. A node knows that it is a partial-juncture node because it has received JC messages over different downtree links, all of which have the same FJ Tree Label entries. Any partial juncture node does the following:

a. Find the most recent entries in the same PJ Tree List slot that match for all of the JC messages received. The first entry is always placed in the PJ Tree List in slot 0, the second in slot 1, and so on. Find the JC message having the fewest entries, for example, 3 entries. Then compare the entries in the highest slot, slot 2, for all JC messages. Some JC messages may have a different number of slots. All JC messages will have at least one entry. If all slot 2 entries are the same, then all previous entries for all JC messages must be the same. If two or more slot 2 entries are different, then compare slot 1 entries and so forth.

b. If a match is found, record the hop count found in that field for later use in sending Alternate Path Priming (APP) messages downtree. To generate a JC message to send uptree, take any one of the JC messages and remove all PJ Tree List entries from the matching slot and higher. If the matching message was in slot 0, insert in slot 0 the node identification of the partial-juncture node and the number of hops from the partial-juncture node to the destination.

c. If no matches are found, record the hop count found in slot 0 from each JC message (one per downtree link) for later use. Generate a new JC message to send uptree by taking any one of the JC messages, removing all PJ Tree List entries, and inserting in slot 0 the node identification of the partial-juncture node and the number of hops from the partial-juncture node to the destination in slot 0.

As an example, consider the full-juncture case by referring to FIG. 4. The JC messages that originate from DEST and travel up the two paths will be associated with different trees by J1 because they will have been given different FJ Tree Labels by the first Nodes a1 and b1. Therefore, J1 will recognize itself as a full-juncture node. Since any full-juncture node uptree from J1 doesn't care if its paths join a path downtree from J1, J1 need only label Juncture Configuration messages that it passes uptree with its own identification. In FIG. 4, when J2 receives Juncture Configuration messages from Nodes c6 and d6, they will be labeled differently, and J2 will recognize that it is a full-juncture node.

The use of the PJ Tree List by partial-juncture nodes is more complex. A juncture node is partial if all paths between it and the destination must pass through a common intermediate node. A juncture node recognizes that it is partial because all of the entries in the FJ Tree Label field of the JC messages are identical.

All JC messages received by a partial-juncture node must have one or more entries in the PJ Tree List for the following reason: If a juncture node is partial, then all messages it receives downtree must have passed through the same node (the one listed in the FJ Tree Label, either a juncture node or the neighbor of the destination). However, there must be a branch in the tree somewhere between the partial-juncture node and the node in the FJ Tree Label. The node at that branch will have put its identification in the PJ Tree List. Therefore, there must be at least one entry in every JC message received by a partial-juncture node.

A partial-juncture node searches for the most recent (highest slot) matching entries in the PJ Tree Lists because the nodes immediately uptree from the node in this slot are the nodes lowest in the tree (closest to the destination) for which the partial-juncture node can be used to find alternate routing information. The reason for this fact is as follows: If all entries in a given slot of the PJ Tree Lists are the same, then all paths downtree from the partial-juncture node must pass through the node that filled that slot. If all entries for a higher slot of the PJ Tree Lists are also the same, then there must be one and only one path between the nodes represented by the two matching sets of entries in the PJ Tree Lists. If there were multiple paths between the two nodes, then the node higher up in the tree would have been a partial-juncture node, and would have removed the lower node from the PJ Tree List. However, a partial-juncture node may only provide a path to an alternate tree for those nodes that are on two separate paths downtree from the partial-juncture node. Therefore, a partial-juncture node can be a juncture node for only those nodes uptree from the node that provided the highest matching entries in the PJ Tree List. If, in a slot higher than that of the matching entries, the entries do not match, then the JC messages must have traveled different paths, and therefore the partial-juncture node can act as a juncture node for those nodes.

Figure 5:
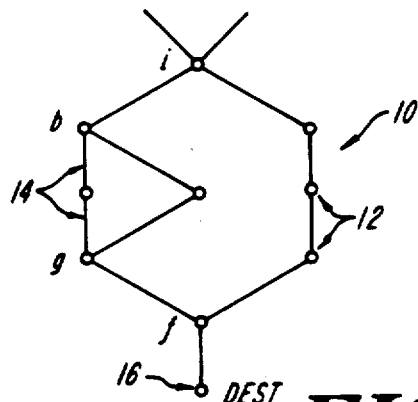
FIGS. 5 and 6 are drawings of communications networks having partial-junction stations.

A few examples will illustrate this concept. First, consider FIG. 5. Node f is a branching node, meaning that f has more than one uptree neighbor with respect to destination DEST. Node f fills in the first slot of the PJ Tree List with [(f,1)]. (The notation for the Tree List is (node ID, hops from destination) for each tuple, and [(tuple 1)], (tuple 2), . . .] for the entire list.) Node g receives this JC message, and appends the PJ Tree List to read [(f,1),(g,2)]. Node h receives this message over both of its downtree links. Since the highest matching entry is (g,2), Node h knows that it can only provide the juncture function for those nodes above Node g. The hop count tells Node h how far downtree to send the APP message later on. Node h deletes (g,2) from the message, and sends [(f,1)] up to Node i. Node i receives [(f,1)] over both downtree links, stores this information for later, and sends [(i,5)] uptree.

Figure 6:
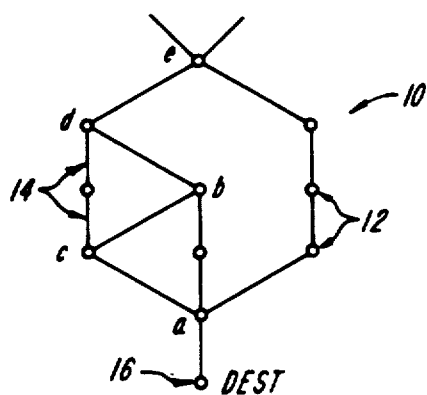

Now consider FIG. 6. Node b receives [(a,1),(c,2)] from its downtree link with c, and [(a,1)] from its other downtree link. Node b therefore knows that it is providing the juncture function to all nodes downtree from it and uptree from Node a. Node b sends [(b,3)] to Node d. Node d receives [(a,1),(c,2)] over its other downtree link. Since there are no matches, it knows that it is providing the juncture function for all nodes above Node b on its downtree link with Node b, and providing the juncture function for all nodes above Node a on its other downtree link. Node e receives message [(d,4)] from Node d, and [(a,1)] over its other downtree link, and makes a decision similar to that of Node i of FIG. 5.

Once a node learns that it is a juncture node, it sends a message downtree called the Alternate Path Priming (APP) message. This message tells downtree nodes (1) that they have an alternate path, (2) whether that path is through a full-juncture node or a partial-juncture node, and (3) how far the destination is via the alternate path. If the juncture node is a full-juncture node, the APP message simply travels downtree until it reaches another full-juncture node. If the juncture node is a partial-juncture node, the APP message has a field that states how far down the APP is to travel, and which partial-juncture node it is from. The partial-juncture node determines how far the APP message is to travel from the hop value received in the PJ Tree List of the JC message. For example, the APP message sent by Node h in FIG. 5 would state that it should travel to nodes further than 2 hops from the destination. This message would therefore not travel to Node g. The APP message sent by Node i would state that it should travel to nodes further than 1 hop from the destination.

When a communications network is in a steady state, that is to say, when all routing data bases are fully configured and no routing messages are active in the network, each node has the following information:

1. The direction of all its links (uptree, horizontal, or downtree) with respect to each destination.
2. The metric value associated with each link.
3. Whether it is a full-juncture node, a partial-juncture node, or neither.
4. The contents of the last JC message received from each downtree and horizontal link.
5. The distance (in both hops and the link metric in use) to the destination via all of its downtree links.

If the node is not a full-juncture node, then it also knows:

6. The distance (for the link metric in use only) to the destination via all uptree links with full-juncture nodes.
7a. The distance (for the link metric in use only) to the destination via all uptree links with partial-juncture nodes.

7b. The distance (in hops only) from the destination that the APP message from each partial-juncture node travels.

If the node is a partial-juncture node, then it also knows:

8. The distance (in hops only) from the destination that its APP message travels for each downtree link.

With this information, each node knows not only its primary path and distance to every destination, but its alternate path and the distance via that path. Therefore, when a node receives a routing update about a certain destination, it knows immediately whether its alternate path will become its primary path. There is no convergence time for finding a new primary path. Instead, the convergence time is spent finding a new alternate path; but this convergence time does not interrupt traffic flow.

Any node can notice one of two possible distance changes over any of its links—the distance can increase (bad news) or the distance can decrease (good news). In the ADR algorithm, we do not distinguish between distance changes discovered via a link metric change or via the receipt of a routing update. Note that metric changes over a link are always with respect to the distance to the destination via that link, be it a primary link or an alternate link. The metric change can of course change the direction of a link, from uptree to downtree, for example, and therefore may change whether it is a primary or alternate path. A node's best path will be its primary path, and will always be downtree. A node's second best path, if it has one, will be its alternate path, and may be a horizontal or an uptree path. If a node has two or more best paths, they are all considered primary (downtree). Recall that Node b is considered downtree from Node a if Node b is on Node a's best path to a destination. If Nobe b is downtree from Node a, then Node a must be uptree from Node b. Otherwise, Node a and Node b are said to be horizontal from each other, even if Node a is closer to the destination, by some metric than Node b.

Nodes receive JC messages from downtree and horizontal neighbors, and send JC message to uptree and horizontal neighbors. Nodes send APP messages downtree and receive APP messages from uptree. A node may not send a JC message uptree or an APP downtree until it has received JCs from all of its downtree and horizontal neighbors. If the spanning tree direction of one or more links changes, a node will forget anything it heard over that link and either wait for a message or send messages, depending on the situation. For example, if a link that was formally downtree or horizontal becomes uptree, as discussed below, the node must forget any JC that it previously heard over that link, and send a JC up that link based on JCs previously received over the downtree and horizontal links that the node still has. If a link that was formally uptree or horizontal becomes downtree, the node must wait for a JC over that link. Once it receives one, it sends out new JCs and APPs based on the newly received JC and those previously received from unchanged downtree and horizontal links. In other words, messages previously received over links that have not changed direction remain active and are used in later calculations.

It is important to consider specifically how link direction changes occur, and more generally how metric changes are handled. Consider the following:

1. Any node uptree from any given Node a is depending on Node a's primary path to derive its primary path.
2. Any node horizontal from Node a may be depending on Node a's primary path to derive its alternate path.
3. Any node downtree from Node a may be depending on Node a's alternate path to derive its alternate path.

Any given Node a responds to several types of metric changes as follows:

1. The distance over Node a's primary path to a destination gets smaller by a distance large enough to invoke an update.

1a. Assume first that Node a has only one downtree link. Then this change impacts uptree nodes and will impact horizontal nodes if they were using Node a as their alternate path. Since no link directions changed, Node a will send routing updates to its uptree and horizontal neighbors indicating the new, shorter distance to the destination. The uptree routing updates must indicate how many hops Node a is from the destination, for reasons explained in 1c below.

1b. Now assume that Node a had other downtree links when it received the good news, and that either (1) Node a is a full-juncture node, or (2) Node a is a partial-juncture node, but the good news is from a node for which Node a is providing an alternate route. In other words, Node a knows that the good news will affect only one of its downtree links. Then those downtree links may become horizontal links. They may also become uptree links, as discussed below in 1d. Node a must send three pieces of information to its new horizontal neighbors: (1) Node a's new distance from the destination, (2) Node a's new relationship with those neighbors (horizontal instead of uptree), and (3) a JC message based on old JCs from Node a's downtree link. These three pieces of information may all be contained in a single message. As soon as Node a receives JC messages from the new horizontal links, Node a must send new JC messages uptree, and a new APP message downtree. These uptree JC messages may also contain the good news, so that two uptree messages (a routing update followed by a JC) are not required.

1c. Now assume that Node a had other downtree links when it received the good news, and that Node a is a partial-juncture node, but that the good news is from a node below those nodes for which Node a is providing an alternate route. In other words, Node a knows that the good news will affect more than one of its downtree links. In this case, Node a may set a timer and wait to hear news from the other downtree links before acting.

1d. Finally, assume that the good news caused one or more of Node a's horizontal or downtree links to become uptree links. Node a must trash the JC messages received from those links, calculate a new JC message, and send that message uptree, along with the distance change. Note that Node a may receive APP messages from uptree in response to any JC messages it sent uptree.

2. The distance over Node a's primary path to a destination gets larger.

2a. Assume first that Node a has only one primary path, and that this change does not cause any links to change direction. Then the action is the same as in 1a above: Node a will send routing updates to its uptree and horizontal neighbors indicating the new, longer distance to the destination.

2b. Now assume that this distance increase causes another link, one that was previously either downtree, horizontal, or uptree, to become the primary, downtree link. Now, the node must take actions similar to those described in 1b-1d above, except that any advertised distances will now be based on the distance to the destination over the new primary link.

3. The distance over Node a's alternate path to a destination gets smaller.

3a. If the change causes no changes in link direction, then all that Node a need do is send a new APP downtree on the primary paths to indicate that the alternate path is closer than before.

3b. If the change causes the alternate path to become the primary path, then the node must take actions similar to those described in 2b above.

4. The distance over Node a's alternate path to a destination gets longer. It is necessary to send a new APP downtree on the primary paths to indicate that the alternate path is longer than before. If the alternate path changes from horizontal to uptree, it will be necessary to send new JC messages on uptree and horizontal links.

5. The distance over a path which is neither the primary or the alternate changes. If the change results in no link direction changes, then no messages are necessary. If the change results in a new alternate or primary path, then changes similar to those described above are required.

Notice that alternate-path distance-vector routing will always prevent counting to infinity, because any metric changes are followed by the appropriate JC and APP messages, thus giving nodes information about where to find valid alternate routes. There will be periods of time during which a node may have no alternate route. Nevertheless, in the event of a single failure on a given path, if a node has another path, the node will always have a primary route. For example, assume that the link over a node's primary path fails. The alternate path, if there is one, will immediately become the primary path, and the node will have no alternate path. However, after the JC message goes out and the APP is returned, the node will have an alternate path that it may use in case of another failure.

In the event of a double failure, it may be possible for a node to have no path to a destination. However, over time, the routing updates and JC and APP messages will converge to correct routing.

Routing Packets Over Alternate Routes

Once nodes have labeled all links as downtree, horizontal, or uptree with respect to a given destination, it is possible to use alternate routing for the purposes of (1) splitting traffic, and (2) responding immediately to link failures. We have derived a simple set of routing rules for using alternate routes, a set of rules that does not involve either 1) labeling the packets as alternate route packets, or 2) source routing the packets. The rules are as follows:

1. Any packet originated at a node may be sent over a horizontal or downtree link, and over an uptree link if there is a juncture node. Obviously, if it is sent uptree, it will take a non-optimal path.

2. Any packet received from a downtree link must be routed via 1) another downtree link if there is one, 2) a horizontal link if ther node is a full-juncture node or is a partial-juncture node but knows of no higher juncture nodes, or 3) on the uptree link to the nearest full juncture node if there is one, or the partial juncture node that is furthest from the destination if there is no full-juncture node.

3. Any packet received from an uptree link may be sent over a horizontal link or a downtree link.

4. Any packet received from a horizontal link must be sent over a downtree link.

With these rules, a packet may only go uptree by starting that way. A packet cannot be going downtree and then be changed to go uptree, unless a path change has caused an inconsistency in the definition of "uptree." These rules prevent uptree-downtree loops. If a packet crosses a horizontal link, it must then go downtree. Thus, the rules prevent a loop of successive horizontal links.

These rules provide two functions. First, they allow a node to immediately reroute packets upon seeing a distance increase over its downtree link. For example, when a non-juncture Node a sees a distance increase over its downtree link, it will immediately choose a different neighbor Node b as its downtree link, if an alternate path is available via Node b. There will be a period of time before Node b receives an update from Node a during which Node b will consider Node a its downtree neighbor, and Node a will consider Node b its downtree neighbor. As the update travels uptree from Node a, but before it reaches a juncture node, there will be successive pairs of nodes that will consider each other their downtree neighbors. If nodes are allowed to receive packets from downtree links and pass them uptree to juncture nodes, then Node a can pass a message to Node b and Node b will not pass it directly back to Node a. However, Node b must pass it to a full-juncture node, because if a partial juncture node passed it back down, it might reach the same node that routed it uptree in the first instance.

The other function that these rules provide is path splitting. By sending packets over multiple links, a node can reduce the impact that a single traffic surge can have on network resources, thus avoiding congestion. This sort of path splitting is probabilistic at best. For instance, there is some likelihood that traffic split at some point will join again at another. Consider FIG. 4. Here, some of the traffic split over J2's downtree paths may join again at b3.

A possible good use for traffic splitting is avoiding local congestion when it occurs. It is not clear that traffic sensitive routing metrics are of much use for shunting short term traffic fluctuations. The problem of oscillation, for example, requires that routing updates be filtered over many seconds at best J. M. McQuillan, 1. Richer, E. C. Rosen, (April 1978) "ARPANET Routing Algorithm Improvements First Semiannual Technical Report," Bolt Beranek and Newman Inc., Report No. 3803. If a queue suddenly becomes congested, several things must happen for routing updates themselves to successfully handle the congestion. First, the congestion must last long enough for the routing updates to propagate around the network and change routes. Second, the routes must change enough for the node or nodes causing the congestion to be rerouted, but not enough for the rerouted traffic to cause congestion in another place.

Normally, dropping packets is the best method of handling severe congestion. (One hopes there is a good network-layer-to-transport-layer congestion avoidance mechanism to avoid severe congestion in the first instance. Unfortunately, such is not always the case.) However, if a node sees severe congestion on its primary path, but little congestion on a horizontal or uptree path, and if the uptree path doesn't take the packet too far out of its way, temporary immediate rerouting of traffic may be effective.

Overhead from Alternate-path Distance-vector Routing

With regard to memory, ADR requires a certain amount of information about each of its connected links for every destination. Node degrees of three of four are typical, so memory consumption is on the order of three or four times the number of destinations for this information. In addition to this information, a node may need to keep track of multiple partial-juncture nodes. However, only configurations such as those shown in FIG. 5, in which partial-junctures are nested, will implicate multiple partial-juncture nodes. Such configurations will occur rarely, and thus will not substantially impact memory usage.

With regard to link usage, in the worst case there will be two messages over the links of nodes affected by a metric change. The affected nodes will usually be all of the nodes uptree from the change, and some downtree nodes. The JC messages will of course be longer than normal routing updates because they will contain the FJ Tree Label and the PJ Tree List. The PJ Tree List, however, will usually not be long because there will be a limited number of uptree branches in the spanning tree, much fewer than the number of links along the diameter of the network. In no event will the PJ Tree List ever have more entries than D, the diameter of the network in numbers of links. Moreover, many PJ Tree List entries will be removed as the JC travels uptree, because partial-juncture and full-juncture nodes will remove PJ Tree List entries. Therefore, the PJ Tree List will not have a substantial impact on link usage.

Other embodiments are within the following claims:

We claim:

1. A communications network comprising:
   a plurality of communications stations interconnected by a plurality of communication links, and
   at least one destination station, wherein, for each destination station,
   each communications station informs each neighboring communications station of the distance between itself and the destination station,
   each communications station stores an indication of the distance to the destination station through each downtree neighboring communications station,
   each communications station that is not a full-junction station stores an indication of the distance to the destination station through all uptree neighboring communications stations that lead to a full-junction station, a full-junction station being a station having at least two downtree paths to the destination station, wherein said downtree paths do not share any communication links, each communications station that is not a full-junction station stores an indication of the distance to the destination station through all uptree neighboring communications stations that lead to a partial-juncture station that acts as a junction station for the communications station that is not a full-junction station, a partial-juncture station being a station having at least two downtree paths to the destination via distinct downtree neighbor stations, wherein said downtree paths share at least one downtree communication link, and communciations are routed to the destination station through said communication links according to the stored distance indications.

2. The communications network of claim 1 wherein each communications station stores information identifying each uptree neighboring communications station as uptree, each downtree neighboring communications station as downtree, and each horizontal neighboring communications station as horizontal.

3. The communications network of claim 2, wherein
   each full-juncture station stores information identifying itself as a full-juncture station,
   each partial-juncture station stores information identifying itself as a partial-juncture station, and
   each communications station that is not a full-juncture station and that is not a partial-juncture station stores information identifying itself as a non-juncture station.

4. The communications network of claim 3 wherein each juncture station determines that it is a juncture station from the fact that the juncture station has more than one neighboring station that is not uptree from the juncture station.

5. The communications network of claim 4 wherein each juncture station determines whether it is a full-juncture station or a partial juncture station based on information contained in a juncture configuration message that the juncture station receives from its non-uptree neighboring stations, and which the juncture station passes on, in modified form, to its non-downtree neighboring stations.

6. The communications network of claim 5 wherein each communications station stores an indication of the metric value associated with each communication link to each neighboring communications station.

7. The communications network of claim 6 wherein each full-juncture station transmits an alternate path priming message to each downtree communications station until the alternate path priming message reaches another full-juncture station, the alternate path priming message informing the downtree communications stations that they have an alternate path to the destination station and that the alternate path passes through a full-juncture station, the alternate path priming message further informing the downtree communications stations of the distance to the destination along the alternate path.

8. The communications network of claim 7 wherein each partial-juncture station transmits an alternate path priming message to each downtree communications station until the alternate path priming message reaches a branching station having at least two uptree paths to the partial-juncture station, the alternate path priming message informing the downtree communications stations that they have an alternate path to the destination station and that the alternate path passes through a partial-juncture station, the alternate path priming message further informing the downtree communications stations of the distance to the destination along the alternate path.

9. The communications network of claim 8 wherein the communications stations respond to failures along paths of communication by updating the information stored in each communications station to reflect changes in the communications network brought about by each failure.

10. The communications network of claim 9 wherein the communications stations respond to metric changes along communication links by updating the information stored in each communications station to reflect changes in the communications network brought about by the metric changes.

11. The communications network of claim 10, wherein each message that travels downtree from one communications station to a second communications station travels to a third communications station that is not uptree from the second communications station, absent a concurrent change in the configuration of the communications network, and each message that travels horizontally from one communications station to a second communications station travels to a third communications station that is downtree from the second communications station, absent a concurrent change in the configuration of the communications network.

12. The communications network of claim 11, wherein each communications station stores information identifying a first neighboring station through which it has a primary path to the destintion station, the primary path being the shortest of all possible paths to the destination station, and each communications station that is connected to the destination station by at least one alternate path stores information identifying a second neighboring station through which it has an alternate path to the destination station.

13. The communications network of claim 12, wherein whenever a failure occurs along the primary path of a communications station, the alternate path becomes a new primary path, and whenever a metric change occurs along the primary path of a communications station, the change causing the distance from the communications station to the destination station to be longer along the primary path than along the alternate path, the alternate pat becomes a new primary path.

14. A communications network comprising:

a plurality of communications stations interconnected by a plurality of communication links, and at least one destination station, wherein, for each destination station, each communications station informs each neighboring communications station of the distance between itself and the destination station, each full-junction station stores information identifying itself as a full-juncture station, a full-juncture station being a station having at least two downtree paths to the destination station, wherein said downtree paths do not share any communication links, each partial-juncture station stores information identifying itself as a partial-juncture station, a partial-juncture station being a station having at least two downtree paths to the destination via distinct downtree neighbor stations, wherein said downtree paths share at least one downtree communication link, each communications station that is not a full-juncture station and that is not a partial-juncture station stores information identifying itself as a non-juncture station, and communications are routed to the destination station through said communication links according to the store information.

15. A communications network comprising:

a plurality of communications stations interconnected by a plurality of communication links, and at least one destination station, wherein, for each destination station, each communications station informs each neighboring communications station of the distance between itself and the destination station, each juncture station determines whether it is a full-juncture station or a partial-juncture station based on information contained in a juncture configuration message that the juncture station receives from its non-uptree neighboring stations, and which the juncture station passes on, in modified form, to its non-downtree neighboring stations, a full-juncture station being a station having at least two downtree paths to the destination station, wherein said downtree paths do not share any communication links, and a partial-juncture station being a station having at least two downtree paths to the destination via distinct downtree neighbor stations, wherein said downtree paths share at least oné downtree communication link, and communications are routed to the destination station through said communication links according to the juncture station determinations.

16. A method of routing messages in a communications network comprising the steps of:

transmitting information from each of a plurality of communications stations, interconnected by a plurality of communication links, to each neighboring communications station, the information indicating the distance between the communications station from which the information is transmitted and at least one destination station, for each destination station, storing in each communications station an indication of the distance to the destination station through each downtree neighboring communications station, for each destination station, storing in each communications station that is not a full-juncture station an indication of the distance to the destination station through all uptree neighboring communications station that lead to a partial-juncture station, a full-juncture station being a station having at least two downtree paths to the destination station, wherein said downtree paths do not share any communciation links, and a partial-juncture station being a station having at least two downtree paths to the destination via distinct downtree neighbor stations, wherein said downtree paths share at least one downtree communication link, for each destination station, storing in each communications station that is not a full-juncture station an indication of the distance to the destination station through all uptree neighboring communications stations that lead to a partial-juncture station that acts as a juncture station for the communications station that is not a full-juncture station, and for each destination station, routing communications to the destination station through said communication links according to the stored distance indications.

17. A method of routing meassages in a communications network comprising the steps of:

transmitting information from each of a plurality of communications stations, interconnected by a plurality of communication links, to each neighboring communications station, the information indicating the distance between the communications station from which the information is transmitted and at lest one destination station, for each destination station, storing in each communications station that is a full-juncture station information identifying it as a full-juncture station, a full-juncture station being a station having at least two downtree paths to the destination station, wherein said downtree paths do not share any communication links, for each destination station, storing in each communications station that is a partial-juncture station information identifying it as a partial-juncture station, a partial-juncture station being a station having at least two downtree paths to the destination via distinct downtree neighbor stations, wherein said downtree paths share at least one downtree communication link, for each destination station, storing in each communications station that is not a full-juncture station and that is not a partial-juncture station information identifying it as a non-juncture station, and for each destination station, routing communications to the destination station through said communication links according to the stored information.

18. The method of claim 17, wherein each juncture station determines that it is a juncture station from the fact that the juncture station has more than one neighboring station that is not uptree from the juncture station.

19. The method of claim 18, wherein each juncture station determines whether it is a full-juncture station or a partial juncture station based on information in a juncture configuration message that the juncture station receives from its non-uptree neighboring stations, and which the juncture station passes on, in modified form, to its non-downtree neighboring stations.

* * * * *

UNITED STATES PATENT AND TRADEMARK OFFICE
CERTIFICATE OF CORRECTION

PATENT NO. : 5,115,495
DATED : May 19, 1992
INVENTOR(S) : Paul F. Tsuchiya, et al.

It is certified that error appears in the above-identified patent and that said Letters Patent is hereby corrected as shown below:

Column 2, line 9: delete "distance vector" and insert therefor -- distance-vector --;

Column 19, line 50: delete "pat" and insert therefor -- path --; and

Column 21, line 13: delete "lest" and insert therefor -- least --.

Signed and Sealed this

Twenty-second Day of February, 1994

Attest:

BRUCE LEHMAN

Attesting Officer

Commissioner of Patents and Trademarks